United States Patent Office 3,153,971
Patented Oct. 27, 1964

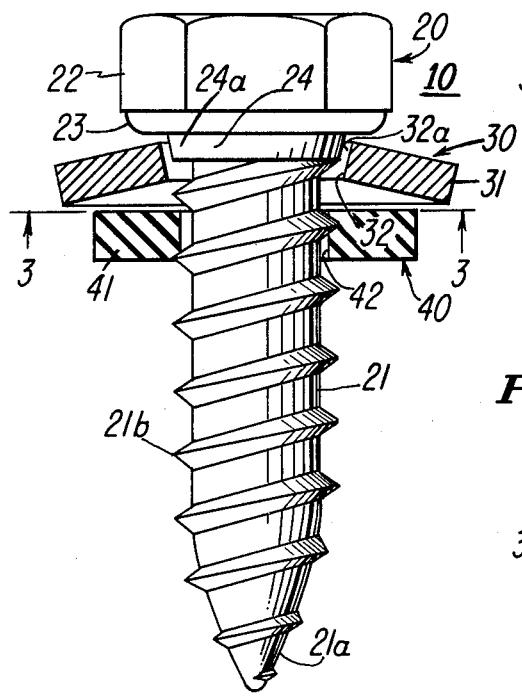
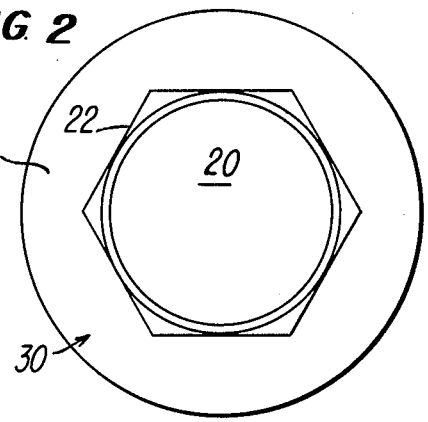
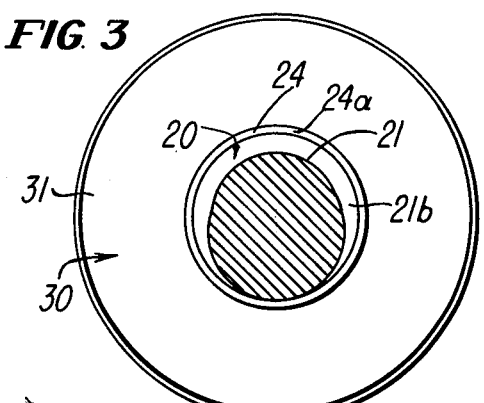
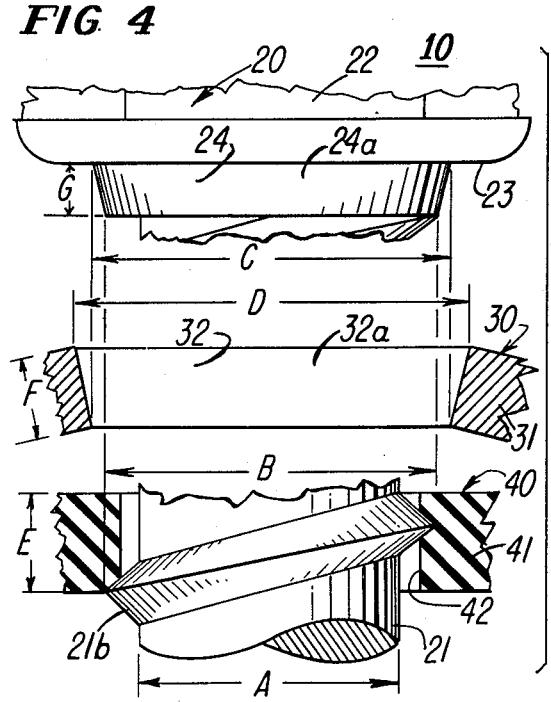
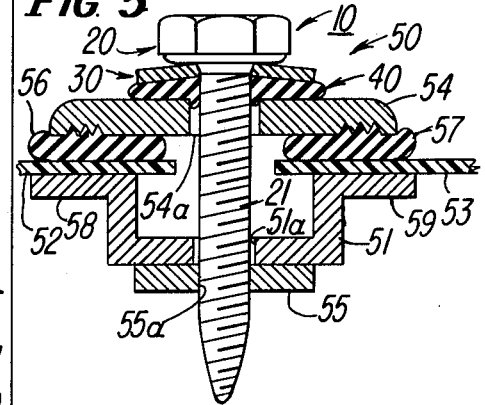
INVENTOR.
Louis J. Lovisek.
BY Prangley, Baird, Clayton, Miller & Vogel,
ATTYS.

3,153,971
SCREW FASTENER HAVING PREASSEMBLED
CLAMPING AND SEALING WASHERS
Louis J. Lovisek, Ridgewood, N.J., assignor to General American Transportation Corporation, Chicago, Ill., a corporation of New York
Filed Mar. 24, 1961, Ser. No. 98,165
4 Claims. (Cl. 85—1)

The present invention relates to preassembled fastener units and more particularly to such units for producing weatherproof joints in other assemblies, such as roofs, etc.

It is a general object of the invention to provide a preassembled fastener unit of the character noted that essentially comprises a metal screw including an elongated threaded shank and an enlarged head terminating one end of the shank, a shoulder carried by the one end of the shank immediately adjacent to and forwardly of the head, a clamping washer formed of yieldable material and loosely carried by the one end of the shank immediately adjacent to the shoulder and forwardly of the head, a sealing washer formed of resilient material and frictionally secured to the one end of the shank immediately adjacent to and forwardly of the clamping washer, whereby the sealing washer retains the clamping washer in assembled relation upon the shank, and centering structure respectively carried by the shoulder and by the clamping washer for positively insuring centering of the clamping washer with respect to the axis of the threaded shank as the screw is tightened toward a cooperating workpiece, whereby the clamping washer compresses the sealing washer into sealed engagement with both the threaded shank and the cooperating workpiece.

Another object of the invention is to provide a preassembled fastener unit of the character described, wherein the shoulder carries a forwardly tapered external centering surface and the clamping washer carries a forwardly tapered internal annular centering surface within the opening provided in the body thereof, whereby the external centering surface is moved into engagement with the internal centering surface as the screw is tightened toward the cooperating workpiece in order positively to insure centering of the clamping washer with respect to the axis of the threaded shank so as to prevent the possibility of offsetting of the sealing washer with respect to the clamping washer incident to the tightening of the screw toward the workpiece.

A further object of the invention is to provide a preassembled fastening unit of the character described that incorporates improved advantageous relationships with respect to the dimensions of the elements of the construction in order positively to insure proper final positioning of the sealing washer below the clamping washer when the screw occupies its set position, so as positively to insure proper sealing of the clamping washer to the workpiece and proper sealing of the clamping washer to the threaded shank of the screw.

Further features of the invention pertain to the particular arrangement of the elements of the preassembled fastener unit, whereby the above-outlined and additional operating features thereof are attained.

The invention, both as to its organization and method of operation, together with further objects and advantages thereof will best be understood by reference to the following specification, taken in connection with the accompanying drawing, in which:

FIGURE 1 is a side elevational view, partly in section, of a preassembled fastener unit embodying the present invention;

FIG. 2 is a plan view of the unit, as shown in FIG. 1;

FIG. 3 is a horizontal sectional view, taken through the unit in the direction of the arrows along the line 3—3 in FIG. 1;

FIG. 4 is an enlarged fragmentary exploded side elevational view, partly in section, of the unit of FIG. 1, illustrating certain advantageous dimensional features of construction thereof; and FIG. 5 is a reduced vertical sectional view of a roof construction, illustrating one application of the unit to secure together a pair of adjacent roof panels, so as to produce a weatherproof joint therebetween.

Referring now to FIGS. 1 to 3, inclusive, of the drawings, there is illustrated a preassembled fastener unit 10 embodying the features of the present invention and essentially comprising a metal screw 20, a cooperating clamping washer 30 and a cooperating sealing washer 40.

The screw 20 is of the self-tapping type including an elongated threaded shank 221 and an enlarged head 22 terminating one end of the shank 21, the other end of the shank 21 terminating in the usual pointed pilot end, as indicated at 21a. The head 22 may be provided with the usual hexagonal configuration, and the front face thereof terminates in a substantially annular shoulder 23. Also, a centering shoulder 24 is carried by the one end of the shank 21 immediately adjacent to and forwardly of the shoulder 23 provided on the head 22, which shoulder 24 is provided with a forwardly tapered external annular centering surface 24a that is employed for a purpose more fully explained below. The screw 20 is formed of hard metal, such, for example, as hardened steel, etc., and may be formed utilizing conventional upsetting and thread-rolling operations, the thread 21b provided upon the shank 21 being preferably formed by a thread-rolling step.

The clamping washer 30 is formed of yieldable material, such, for example, as steel, etc., and includes an annular body 31 having a centrally disposed opening 32 therethrough, the body 31 surrounding the one end of the shank 21 adjacent to the shoulder 24, as previously noted. The opening 32 provided through the clamping washer 30 defines therein a forwardly tapered internal annular centering surface 32a that is employed for a purpose more fully explained below. Preferably the body 31 of the clamping washer 30 is forwardly dished so that it is readily yieldable in compression by engagement with the shoulder 23 carried by the front face of the head 22 when the screw 20 is tightened toward a cooperating workpiece.

The sealing washer 40 is formed of resilient material, such, for example, as neoprene, etc., and includes an annular body 41 having a centrally disposed aperture 42 therethrough, the body 41 surrounding the one end of the shank 21 immediately adjacent to and forwardly of the clamping washer 30. More particularly, the diameter of the aperture 42 provided in the body 41 is somewhat smaller than the major diameter of the threaded shank 21 so that the sealing washer 40 is frictionally secured in place upon the one end of the threaded shank 21; whereby the sealing washer 40 retains the clamping washer 30 in assembled relation upon the one end of the shank 21.

In the utilization of the preassembled fastening unit, the tapered pilot end 21a of the threaded shank 21 of the screw 20 is inserted into a pilot hole formed in a cooperating workpiece, and thereafter, rotation of the screw 20 causes first the tapered pilot end 21a of the threaded shank 21 and then the main body of the thread 21b provided upon the shank 21 to be advanced into the workpiece tapping an internal thread in the pilot hole provided in the workpiece as the screw 20 is advanced. As the screw 20 is set, the front side of the body 41 of the sealing washer 40 engages the workpiece so that further advancement of the screw 20 causes the clamping washer 30 to engage the rear side of the sealing washer 40, with the result that the sealing washer 40 is compressed between the workpiece and the clamping washer 30. As the head 22 of the screw 20 is advanced toward the clamping washer 30, the external centering surface 24a carried by the shoulder 24 enters the opening 32 provided in the body 31 of the clamping washer 30 and cooperates with the internal centering surface 32a so as positively to insure centering of the clamping washer 30 with respect to the axis of the threaded shank 21 of the screw 20 as the clamping washer 30 is advanced into further engagement with the sealing washer 40. This positive centering of the clamping washer 30 with respect to the axis of the threaded shank 21 due to the cooperation between the forwardly tapered external centering surface 24a and the forwardly tapered internal centering surface 32a positively insures concentricity between the screw 20 and the clamping washer 30, and consequent concentricity between the clamping washer 30 and the sealing washer 40 as the screw 20 is set. Since the clamping washer 30 is maintained in a concentric position with respect to the sealing washer 40, as the screw 20 is set, the sealing washer 40 is uniformly compressed, with the result that it expands uniformly and concentrically with respect to the clamping washer 30, so as positively to insure that the internal portion of the body 41 is firmly sealed entirely around the threaded shank 21 of the screw 20, and so as positively to insure that the external portion of the body 41 is firmly sealed entirely around the forward edge or skirt of the clamping washer 31, with the result that the joint is rendered entirely weatherproof. More particularly, the sealing washer 40 is sealed mutually to the workpiece and to the threaded shank 21 of the screw 20 and to the front side of the clamping washer 30, the sealing washer 40 being maintained in its thus deformed sealing position by the clamping forces exerted thereupon between the clamping washer 30 and the associated workpiece.

Referring now to FIG. 4, certain advantageous relations among the dimensions of the elements of the preassembled fastener unit 20 are illustrated. As depicted: the minor diameter of the threaded shank 21 of the screw 20 is indicated as "A"; the major diameter of the threaded shank 21 is indicated as "B"; the minor diameter of the forwardly tapered internal centering surface 32a provided in the clamping washer 30 is indicated as "C"; the major diameter of the forwardly tapered internal centering surface 32a is indicated as "D"; the minor diameter of the forwardly tapered external centering surface 24a provided on the shoulder 24 is indicated as "B"; the major diameter of the forwardly tapered external centering surface 24a is indicated as "C"; the thickness of the sealing washer 40 between the front and rear sides thereof is indicated as "E"; the thickness of the clamping washer 30 between the front and rear sides thereof is indicated as "F"; and the length of the shoulder 24 between the front and rear ends thereof is indicated as "G." Thus in the arrangement: the minor diameter "B" of the forwardly tapered external surface 24a is the same as the major diameter "B" of the threaded shank 21; the major diameter "C" of the forwardly tapered external surface 24a is the same as the minor diameter "C" of the forwardly tapered internal centering surface 32a; and, of course, the major diameter "D" of the forwardly tapered internal centering surface 32a is somewhat greater than the minor diameter "C" thereof. Also, in the arrangement, the minor diameter "B" of the forwardly tapered external surface 24a is the same as the major diameter "B" of the threaded shank 21; the major diameter "C" of the forwardly tapered external surface 24a is the same as the minor diameter "C" of the forwardly tapered internal centering surface 32a; and, of course, the major diameter "D" of the forwardly tapered internal centering surface 32a is somewhat greater than the minor diameter "C" thereof.

Also, in the arrangement, the thickness "E" of the sealing washer 40 is somewhat greater than the thickness "F" of the clamping washer 30; and the length "G" of the shoulder 24 is approximately ⅔ of the thickness "F" of the sealing washer 30. In the manufacture of the preassembled fastener unit 10, the aforesaid relations may be advantageously maintained over a wide range of sizes of the screw 20.

Referring now to FIG. 5, there is illustrated a roof structure 50 comprising a weatherproof joint incorporating the preassembled fastener unit 10 of the present invention. More particularly, the roof structure 50 comprises a rafter 51 that may be formed of an extruded aluminum alloy, two roof panels 52 and 53 that may be formed of fiber glass reinforced plastic material, such, for example, as a polyester resin, an outside sealing cap 54 that may be formed of an extruded aluminum alloy, an inside clamping strip 55 that may be formed of an extruded aluminum alloy, two sealing gaskets 56 and 57 that may be formed of resilient material, such, for example, as neoprene, and the preassembled unit 10. In the arrangement, the rafter 51 may be of substantially U-shape in lateral cross-section including a pair of abutments 58 and 59 against which the opposite sides of the roof panels 52 and 53 are directly supported. The sealing cap 54 is arranged above the roof panels 52 and 53 with the opposite sides thereof disposed in over-lapped relation with respect to the respectively adjacent side edges of the roof panels 52 and 53; and the two sealing gaskets 56 and 57 are respectively arranged between the opposite sides of the sealing cap 54 and the adjacent side edges of the roof panels 52 and 53. The threaded shank 21 of the screw 20 extends through a centrally disposed opening 54a provided in the sealing cap 54 and thence through a centrally disposed opening 51a provided in the web of the rafter 51 and terminates in threaded engagement with an opening 55a provided in the clamping strip 55.

In producing the roof 50, the pilot end of the threaded shank 21 of the screw 20 is inserted through the aligned openings 54a and 51a respectively provided in the elements 54 and 55 and thence into the pilot opening 55a provided in the clamping strip 55. Thereafter the screw 20 is pressed home and rotated; whereby the threaded shank 21 of the screw 20 taps its own thread internally of the opening 55a provided in the clamping strip 55, with the result that the screw 20 is set forcing the clamping washer 30 into firm engagement with the sealing washer 40, so that the sealing cap 54 is pressed into firm engagement with the gaskets 56 and 57. Of course, the gaskets 56 and 57 press the adjacent side edges of the roof panels 52 and 53 into firm engagement with the abutments 58 and 59 carried by the rafter 51; and also the threaded shank 21 forces the clamping strip 55 into firm engagement with the adjacent web of the rafter 51. When the screw 20 is thus set, the resilient sealing gasket 40 is deformed so that the clamping washer 30 is sealed to the sealing cap 54 and so that both the clamping washer 30 and the sealing cap 54 are sealed to the threaded shank 21 of the screw 20. Also, the clamping pressure effects deformation of the sealed gaskets 56 and 57, thereby to seal the opposite sides of the sealing cap 54 to the adjacent edges of the roof panels 52 and 53, respectively. Accordingly, when the screw 20 of the unit 10 is set, the roof structure 50 is securely retained in assembled relation, and also a weatherproof joint is provided between the roof panels 52 and 53 by the sealing washer 40 and by the sealing gaskets 51 and 57.

The utilization of the preassembled fastener units 10 in the construction of the roof structure 50 is very advantageous, as the same accommodates ready assembly of the roof structure 50 and positively insures the formation of a completely weatherproof joint between the roof panels incorporated therein. Moreover, the utilization of the preassembled fastener units 10 greatly facilitates the rapid construction of the roof structure 50, since the workmen encounter the necessary elements of the units 10 in completely assembled relationship, thereby eliminating otherwise tedious and time-consuming manipulative operations in making the construction of the roof structure 50.

While the utilization of the preassembled fastener unit 10 of the present invention has been particularly described with respect to its utility in the construction of the roof structure 50, it will be readily understood that these units 10 have a wide range of application in the construction and fabrication of tanks, buildings, etc., and greatly facilitate the ease with which such constructions may be produced in a rapid and ready manner, so as to achieve completely weathertight joints between the panels or parts thereof that are fabricated or assembled in the constructions.

In view of the foregoing, it is apparent that there has been provided a preassembled fastener unit of improved and simplified construction and arrangement that positively insures the production of a weathertight joint with an associated workpiece incident to the mere setting of the screw thereof, due to the positive centering of the clamping washer thereof with respect to the threaded shank of the screw, and the consequent positive centering of the sealing washer thereof with respect to the clamping washer.

While there has been described what is at present considered to be the preferred embodiment of the invention, it will be understood that various modifications may be made therein, and it is intended to cover in the appended claims all such modifications as fall within the true spirit and scope of the invention.

What is claimed is:

1. A preassembled fastener unit comprising a metal screw including an elongated threaded shank and an enlarged head terminating one end of said shank, a shoulder having a radially extending surface carried by said one end of said shank immediately adjacent to and forwardly of said head, a clamping washer formed of yieldable sheet metal and carried by said one end of said shank immediately adjacent to said shoulder and forwardly of said head, said clamping washer comprising an annular conical body having parallel frusto-conical top and bottom surfaces and a centrally disposed opening therethrough and loosely surrounding said one end of said shank, a sealing washer formed of resilient sheet material and carried by said one end of said shank immediately adjacent to and forwardly of said clamping washer, said sealing washer comprising an annular flat body having a centrally disposed aperture therethrough and tightly surrounding said one end of said shank, whereby said sealing washer is frictionally secured to said one end of said shank independently of said clamping washer and said clamping washer is retained in assembled relation upon said shank jointly by said head and by said sealing washer, a forwardly tapered external annular centering surface carried by said shoulder, a forwardly tapered internal annular centering surface carried by said clamping washer within said opening, said external centering surface cooperating with said internal centering surface as said screw is tightened toward the cooperating workpiece so as positively to insure centering of said clamping washer with respect to the axis of said threaded shank, the body of said clamping washer being forwardly dished and having the outer periphery thereof initially extending beyond the outer periphery of said sealing washer and initially contacting said sealing washer at the outer periphery thereof, the body of said clamping washer being readily yieldable in compression by the engagement thereof adjacent to said opening with said shoulder when said screw is tightened toward a cooperating workpiece, thereby to cause said clamping washer progressively to compress and to deform said sealing washer both inwardly into sealing engagement with said threaded shank and forwardly against the cooperating workpiece.

2. The preassembled fastener unit set forth in claim 1, wherein said screw is of the self-tapping type.

3. The preassembled fastener unit set forth in claim 1, wherein said clamping washer is formed essentially of steel and said sealing washer is formed essentially of neoprene.

4. The preassembled fastener unit set forth in claim 1, wherein said sealing washer has a thickness that is somewhat greater than that of said clamping washer and said clamping washer has a thickness that is somewhat greater than the length of said shoulder between the front and rear ends thereof.

References Cited in the file of this patent

UNITED STATES PATENTS

| | | |
|---|---|---|
| 993,676 | Gillmor | May 30, 1911 |
| 1,814,502 | Barwood | July 14, 1931 |
| 2,681,678 | Hagee | June 22, 1954 |
| 2,761,347 | McKee | Sept. 4, 1956 |

FOREIGN PATENTS

| | | |
|---|---|---|
| 341,333 | Great Britain | Jan. 15, 1931 |
| 730,343 | Great Britain | May 18, 1955 |
| 1,168,743 | France | Dec. 15, 1958 |